US012130696B1

(12) United States Patent
Acharya et al.

(10) Patent No.: US 12,130,696 B1
(45) Date of Patent: Oct. 29, 2024

(54) SYSTEMS, APPARATUSES, METHODS, AND COMPUTER PROGRAM PRODUCTS FOR PARALLEL PROCESSING OF REAL-TIME DATA AND ACCUMULATED DATA

(71) Applicant: HONEYWELL INTERNATIONAL INC., Charlotte, NC (US)

(72) Inventors: Bhabesh Chandra Acharya, Bangalore (IN); Santimreddigari Manjunatha Reddy, Madanapalle (IN)

(73) Assignee: Honeywell International Inc., Charlotte, NC (US)

( * ) Notice: Subject to any disclaimer, the term of this patent is extended or adjusted under 35 U.S.C. 154(b) by 15 days.

(21) Appl. No.: 18/300,303

(22) Filed: Apr. 13, 2023

(51) Int. Cl.
*G06F 11/00* (2006.01)
*G06F 11/07* (2006.01)
(52) U.S. Cl.
CPC ...... *G06F 11/0784* (2013.01); *G06F 11/0709* (2013.01); *G06F 11/0787* (2013.01)
(58) Field of Classification Search
CPC ............. G06F 11/0784; G06F 11/0709; G06F 11/0787
See application file for complete search history.

(56) References Cited

U.S. PATENT DOCUMENTS

| | | | | | |
|---|---|---|---|---|---|
| 6,643,802 B1* | 11/2003 | Frost | ................... | G06F 11/0724 | 714/37 |
| 6,868,512 B1* | 3/2005 | Miller | ..................... | H01L 22/20 | 714/724 |
| 9,064,043 B2* | 6/2015 | Cathro | ................ | G06F 11/3013 | |
| 10,154,095 B2* | 12/2018 | Standley | ................. | H04L 67/12 | |
| 2004/0042472 A1* | 3/2004 | Satoh | ...................... | H04L 41/06 | 370/401 |
| 2013/0307693 A1* | 11/2013 | Stone | ..................... | G08B 31/00 | 340/573.1 |
| 2017/0364818 A1* | 12/2017 | Wu | ...................... | G06F 11/3006 | |
| 2018/0260266 A1* | 9/2018 | Liu | .......................... | G06F 16/00 | |
| 2018/0285580 A1* | 10/2018 | Chen | ..................... | H04W 12/02 | |
| 2018/0314949 A1* | 11/2018 | Bender | ................. | G06Q 50/02 | |
| 2020/0264572 A1* | 8/2020 | Sha | ......................... | G05B 15/02 | |
| 2021/0133054 A1* | 5/2021 | Alcorn | ............... | G06F 11/3034 | |
| 2021/0315151 A1* | 10/2021 | Schoon | .............. | G01C 21/3807 | |
| 2023/0118188 A1* | 4/2023 | Arora | .................. | G06F 11/0709 | 714/4.1 |

* cited by examiner

*Primary Examiner* — Amine Riad
(74) *Attorney, Agent, or Firm* — Alston & Bird LLP

(57) ABSTRACT

Systems, apparatuses, methods, and computer program products for parallel processing of real-time data and accumulated data are provided. For example, a method provided herein may include determining that a computing device is affected by a fault during a first time period. The method may include receiving real-time data from the computing device via a network during a second time period. The method may include receiving accumulated data from the computing device via a network during the second time period. The method may include directing the real-time data to a real-time data processing unit and the accumulated data to an accumulated data processing unit. The method may include processing the real-time data with the real-time data processing unit and the accumulated data with the accumulated data processing unit. The method may include routing the real-time data and the accumulated data following the processing to one or more databases.

20 Claims, 5 Drawing Sheets

SYSTEMS, APPARATUSES, METHODS, AND COMPUTER PROGRAM PRODUCTS FOR PARALLEL PROCESSING OF REAL-TIME DATA AND ACCUMULATED DATA

TECHNOLOGICAL FIELD

Embodiments of the present disclosure relate generally to parallel processing of real-time data and accumulated data.

BACKGROUND

Applicant has identified many technical challenges and difficulties associated with processing of real-time data and accumulated data. Through applied effort, ingenuity, and innovation, Applicant has solved problems related to processing of real-time data and accumulated data by developing solutions embodied in the present disclosure, which are described in detail below.

BRIEF SUMMARY

Various embodiments described herein relate to parallel processing of real-time data and accumulated data.

In accordance with one aspect of the disclosure, a computer-implemented method for parallel processing of real-time data and accumulated data is provided. In some embodiments, the method may include determining that a computing device is affected by a fault during a first time period. In some embodiments, the method may include receiving real-time data from the computing device via a network during a second time period. In some embodiments, the method may include receiving accumulated data from the computing device via a network during the second time period. In some embodiments, the accumulated data was generated by the computing device during the first time period. In some embodiments, the method may include directing the real-time data to a real-time data processing unit and the accumulated data to an accumulated data processing unit. In some embodiments, the method may include processing the real-time data with the real-time data processing unit and the accumulated data with the accumulated data processing unit. In some embodiments, the method may include routing the real-time data and the accumulated data following the processing to one or more databases.

In some embodiments, the fault comprises the computing device being disconnected from the network.

In some embodiments, the one or more databases are time series databases.

In some embodiments, the method may include receiving historical data from a historical database. In some embodiments, the method may include directing the historical data to a historical data processing unit. In some embodiments, the method may include routing the historical data following the processing to the one or more databases.

In some embodiments, the historical data is received from the historical database during the first time period, the second time period, or a third time period.

In some embodiments, the method may include generating at least one statistical representation indicating whether the historical data meets an accuracy threshold. In some embodiments, the method may include causing the at least one statistical representation to be displayed on a user interface.

In some embodiments, the real-time data processing unit and the accumulated data processing unit comprise one or more of ontology circuitry or normalization circuitry. In some embodiments, the ontology circuitry is configured to associate computing device metadata with the real-time data and the accumulated data.

In some embodiments, the real-time data and the accumulated data comprises sensor data representing the operations of an asset associated with the computing device.

In accordance with another aspect of the disclosure, an apparatus for parallel processing of real-time data and accumulated data is provided. In some embodiments, the apparatus for parallel processing of real-time data and accumulated data may include at least one processor and at least one memory coupled to the at least one processor. In some embodiments, the at least one processor is configured to determine that a computing device is affected by a fault during a first time period. In some embodiments, the at least one processor is configured to receive real-time data from the computing device via a network during a second time period. In some embodiments, the at least one processor is configured to receive accumulated data from the computing device via a network during the second time period. In some embodiments, the accumulated data was generated by the computing device during the first time period. In some embodiments, the at least one processor is configured to direct the real-time data to a real-time data processing unit and the accumulated data to an accumulated data processing unit. In some embodiments, the at least one processor is configured to process the real-time data with the real-time data processing unit and the accumulated data with the accumulated data processing unit. In some embodiments, the at least one processor is configured to route the real-time data and the accumulated data following the processing to one or more databases.

In some embodiments, the fault comprises the computing device being disconnected from the network.

In some embodiments, the one or more databases are time series databases.

In some embodiments, the at least one processor is configured to receive historical data from a historical database. In some embodiments, the at least one processor is configured to direct the historical data to a historical data processing unit. In some embodiments, the at least one processor is configured to route the historical data following the processing to the one or more databases.

In some embodiments, the historical data is received from the historical database during the first time period, the second time period, or a third time period.

In some embodiments, the at least one processor is configured to generate at least one statistical representation indicating whether the historical data meets an accuracy threshold. In some embodiments, the at least one processor is configured to cause the at least one statistical representation to be displayed on a user interface.

In some embodiments, the real-time data processing unit and the accumulated data processing unit comprise one or more of ontology circuitry or normalization circuitry. In some embodiments, the ontology circuitry is configured to associate computing device metadata with the real-time data and the accumulated data.

In some embodiments, the real-time data and the accumulated data comprises sensor data representing the operations of an asset associated with the computing device.

In accordance with another aspect of the disclosure, a non-transitory computer-readable storage medium for parallel processing of real-time data and accumulated data is provided. In some embodiments, the non-transitory computer-readable storage medium for parallel processing of real-time data and accumulated data may include computer program code for execution by one or more processors of a device. In some embodiments, the computer program code configured to, when executed by the one or more processors, cause the device to In some embodiments, the computer program code configured to, when executed by the one or more processors, cause the device to determine that a computing device is affected by a fault during a first time period. In some embodiments, the computer program code configured to, when executed by the one or more processors, cause the device to receive real-time data from the computing device via a network during a second time period. In some embodiments, the computer program code configured to, when executed by the one or more processors, cause the device to receive accumulated data from the computing device via a network during the second time period. In some embodiments, the accumulated data was generated by the computing device during the first time period. In some embodiments, the computer program code configured to, when executed by the one or more processors, cause the device to direct the real-time data to a real-time data processing unit and the accumulated data to an accumulated data processing unit. In some embodiments, the computer program code configured to, when executed by the one or more processors, cause the device to process the real-time data with the real-time data processing unit and the accumulated data with the accumulated data processing unit. In some embodiments, the computer program code configured to, when executed by the one or more processors, cause the device to route the real-time data and the accumulated data following the processing to one or more databases.

In some embodiments, the fault comprises the computing device being disconnected from the network.

In some embodiments, the one or more databases are time series databases.

In some embodiments, the computer program code configured to, when executed by the one or more processors, cause the device to receive historical data from a historical database. In some embodiments, the computer program code configured to, when executed by the one or more processors, cause the device to direct the historical data to a historical data processing unit. In some embodiments, the computer program code configured to, when executed by the one or more processors, cause the device to route the historical data following the processing to the one or more databases.

In some embodiments, the historical data is received from the historical database during the first time period, the second time period, or a third time period.

In some embodiments, the computer program code configured to, when executed by the one or more processors, cause the device to generate at least one statistical representation indicating whether the historical data meets an accuracy threshold. In some embodiments, the computer program code configured to, when executed by the one or more processors, cause the device to cause the at least one statistical representation to be displayed on a user interface.

In some embodiments, the real-time data processing unit and the accumulated data processing unit comprise one or more of ontology circuitry or normalization circuitry. In some embodiments, the ontology circuitry is configured to associate computing device metadata with the real-time data and the accumulated data.

In some embodiments, the real-time data and the accumulated data comprises sensor data representing the operations of an asset associated with the computing device.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
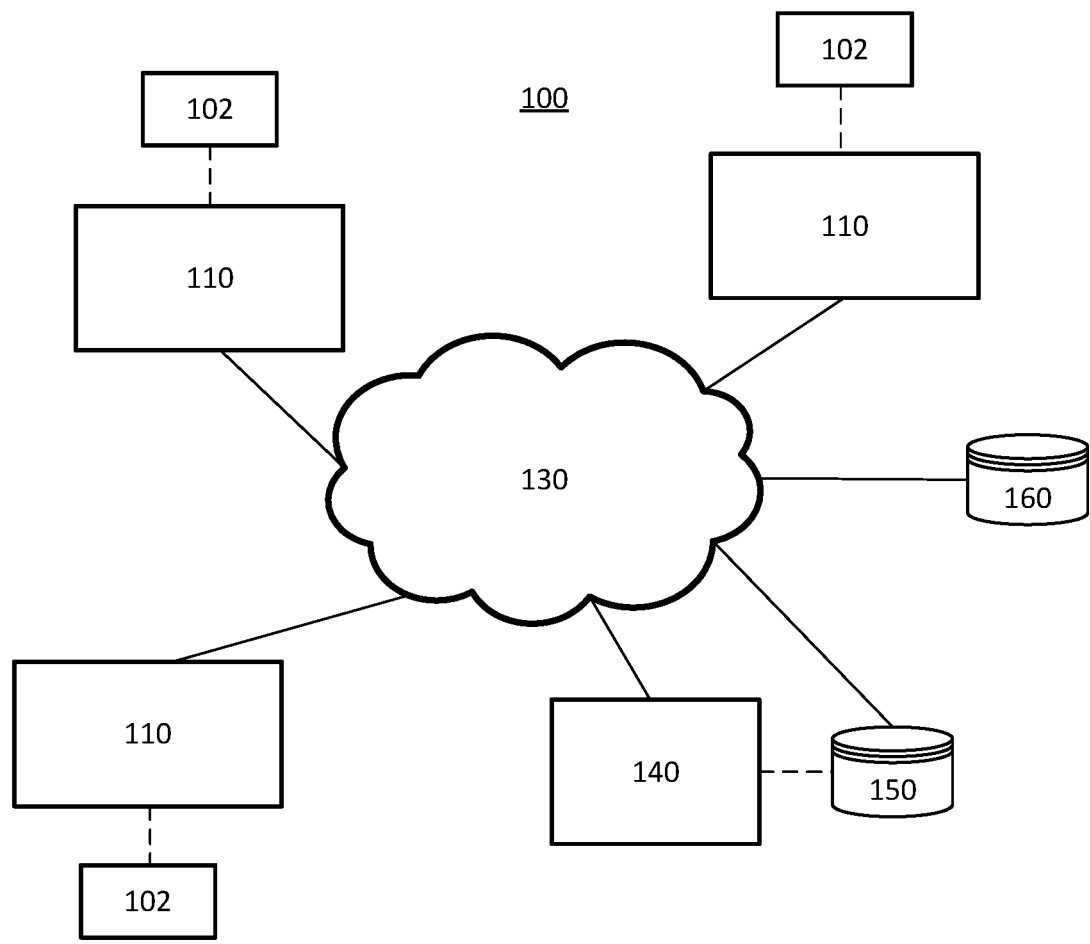
FIG. 1 illustrates an exemplary block diagram of an environment in which embodiments of the present disclosure may operate.

Example embodiments will be described more fully hereinafter with reference to the accompanying drawings, in which some, but not all embodiments of disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Example embodiments disclosed herein address technical problems associated processing real-time data and accumulated data. As would be understood by one skilled in the field to which this disclosure pertains, there are numerous example scenarios in which a user may use processing real-time data and accumulated data.

In many applications, it is often necessary to process real-time data and accumulated data. For example, many applications (e.g., a cloud computing application) may be configured to receive real-time data from one or more computing devices (e.g., one or more computing devices that are each associated with a tenant and/or asset). In some examples, there may be time periods in which the one or more computing devices are affected by a fault and are unable to transmit the real-time data (a computing device is disconnected from a network over which is transmits the real-time data to the application). However, even when affected by a fault many computing devices may continue to generate data. As such, when the fault affecting the computing device is resolved, the computing device may transmit real-time data and accumulated data that was generated when the computing device is affected by the fault to the application. As a result, putting strain on the application due to the surge in demand for processing the data received from the computing device (e.g., because the application receives the accumulated data in addition to the real-time data).

Example solutions for processing real-time data and accumulated data include, for example, designing the application such that the application can scale up the amount of processing power it allocates to processing the data (e.g., real-time data and accumulated data) that it receives from the computing device affected by a fault. However, such a solution results in processing power being taken away from the processing of real-time data from other computing devices (e.g., ones not affected by a fault), which may result in latency in the processing of the real-time data from other computing devices (e.g., the noisy neighbor problem). Accordingly, there is a need for systems, apparatuses, computer program products, and methods for the processing of real-time data and accumulated data from computing devices that have been affected by a fault without impacting the processing of real-time data from other computing devices not affected by a fault.

Thus, to address these and/or other issues related to processing of real-time data and accumulated data, example systems, apparatuses, computer program products, and/or methods for parallel processing of real-time data and accumulated data are disclosed herein. For example, an embodiment in this disclosure, described in greater detail below, includes a computer-implemented method for determining that a computing device is affected by a fault during a first time period. The computer-implemented method may include receiving real-time data from the computing device via a network during a second time period. The computer-implemented method may include receiving accumulated data from the computing device via a network during the second time period. In some embodiments, the accumulated data was generated by the computing device during the first time period. The computer-implemented method may include directing the real-time data to a real-time data processing unit and the accumulated data to an accumulated data processing unit. The computer-implemented method may include processing the real-time data with the real-time data processing unit and the accumulated data with the accumulated data processing unit. The computer-implemented method may include routing the real-time data and the accumulated data following the processing to one or more databases. Accordingly, embodiments disclosed herein enable the parallel processing of real-time data and accumulated data from a device that has suffered a fault by segregating the real-time data and accumulated data and processing each in parallel in separate processing units. Thus, preventing the processing of the real-time data and the accumulated data from impacting the processing of real-time data from other computing devices not affected by a fault.

Example Apparatuses and Systems

Embodiments of the present disclosure herein include systems, apparatuses, methods, and computer program products configured parallel processing of real-time data and accumulated data. It should be readily appreciated that the embodiments of the apparatus, systems, methods, and computer program product described herein may be configured in various additional and alternative manners in addition to those expressly described herein.

FIG. 1 illustrates an exemplary block diagram of an environment 100 in which embodiments of the present disclosure may operate. Specifically, FIG. 1 illustrates one or more computing devices 110. In some embodiments, each of the one or more computing devices 110 may be associated with an asset 102. In some embodiments, for example, the one or more assets 102 may be any type of facility associated with a user associated with the environment 100. For example, the one or more assets 102 may include at least one plant. In this regard, the one or more assets 102 may, for example, be a processing plant that receives and processes ingredients as inputs to create a final product, such as a hydrocarbon processing plant, a refinery plant, a drilling plant, a fracking plant, and/or the like. Additionally or alternatively, for example, the one or more assets 102 may include at least one building. In this regard, the one or more assets 102 may, for example, be an industrial building, office building, warehouse, building associated with a plant, and/or the like. In some embodiments, each of the one or more computing devices 110 and/or each of the one or more assets 102 may be associated with a tenant. In some embodiments a tenant may be an owner and/or operator of an associated computing device and/or asset.

In some embodiments, each computing device of the one or more computing devices 110 may be electronically and/or communicatively coupled to an associated asset of the one or more assets 102 and/or individual components of an associated asset of the one or more assets 102. In some embodiments, each computing device of the one or more computing devices 110 may be located remotely, in proximity of, and/or within an associated asset of the one or more assets 102. In some embodiments, each computing device of the one or more computing devices 110 is configured via hardware, software, firmware, and/or a combination thereof, to perform data intake of one or more types of data associated with one or more of the one or more assets 102. Additionally or alternatively still, in some embodiments, each computing device of the one or more computing devices 110 is configured via hardware, software, firmware, and/or a combination thereof, to perform data reporting and/or other data output process(es) associated with monitoring or otherwise analyzing operations of one or more of the one or more assets 102 or specific component(s) thereof. In this regard, for example, each computing device of the one or more computing devices 110 may comprise one or more sensors configured to capture data associated with the one or more assets 102. For example, each computing device of the one or more computing devices 110 may comprises one or more of a heat sensor, a gas sensor, a temperature sensor, a humidity sensor, a particulate matter sensor, vibration sensor, an acceleration sensor, and/or the like.

The network 130 may be embodied in any of a myriad of network configurations. In some embodiments, the network 130 may be a public network (e.g., the Internet). In some embodiments, the network 130 may be a private a private network (e.g., an internal localized, or closed-off network between particular devices). In some other embodiments, the network 130 may be a hybrid network (e.g., a network enabling internal communications between particular connected devices and external communications with other devices). In various embodiments, the network 130 may include one or more base station(s), relay(s), router(s), switch(es), cell tower(s), communications cable(s), routing station(s), and/or the like. In various embodiments, components of the environment 100 may be communicatively coupled to transmit data to and/or receive data from one another over the network 130. Such configuration(s) include, without limitation, a wired or wireless Personal Area Network (PAN), Local Area Network (LAN), Metropolitan Area Network (MAN), Wide Area Network (WAN), and/or the like.

In some embodiments, the environment 100 may include an apparatus for parallel processing of real-time data and accumulated data 140. The apparatus for parallel processing of real-time data and accumulated data 140 may be electronically and/or communicatively coupled to the one or more computing devices 110, the one or more assets 102, the one or more databases 150, and/or the historical database 160. The apparatus for parallel processing of real-time data and accumulated data 140 may be located remotely, in proximity of, and/or within a particular computing device of the one or more computing devices 110 and/or a particular asset the one or more assets 102. In some embodiments, the apparatus for parallel processing of real-time data and accumulated data 140 is configured via hardware, software, firmware, and/or a combination thereof, to perform data intake of one or more types of data associated with one or more of the one or more assets 102, the historical database 160, and/or the one or more computing devices 110 (e.g., real-time data, accumulated data, and/or historical data). Additionally or alternatively, in some embodiments, the apparatus for parallel processing of real-time data and accumulated data 140 is configured via hardware, software, firmware, and/or a combination thereof, to generate and/or transmit command(s) that control, adjust, or otherwise impact operations of one or more of the one or more assets 102, the one or more databases 150, the historical database 160, and/or the one or more computing devices 110. Additionally or alternatively still, in some embodiments, the apparatus for parallel processing of real-time data and accumulated data 140 is configured via hardware, software, firmware, and/or a combination thereof, to perform data reporting and/or other data output process(es) associated with monitoring or otherwise analyzing operations of one or more of the one or more assets 102, the historical database 160, the one or more databases 150 and/or the one or more computing devices 110, for example for generating and/or outputting report(s) corresponding to the operations performed via the one or more assets 102 and/or the one or more computing devices 110. For example, in various embodiments, the apparatus for parallel processing of real-time data and accumulated data 140 may be configured to execute and/or perform one or more operations and/or functions described herein.

The one or more databases 150 and/or the historical database 160 may be configured to receive, store, and/or transmit data, such as real-time data, accumulated data, and/or historical data. In some embodiments, the real-time data, accumulated data, and/or historical data may be received from the one or more assets 102, the one or more computing devices 110, and/or the historical database 160. Additionally, while FIG. 1 illustrates certain components as separate, standalone entities communicating over the network 130, various embodiments are not limited to this configuration. In other embodiments, one or more components may be directly connected and/or share hardware or the like.

Figure 2:
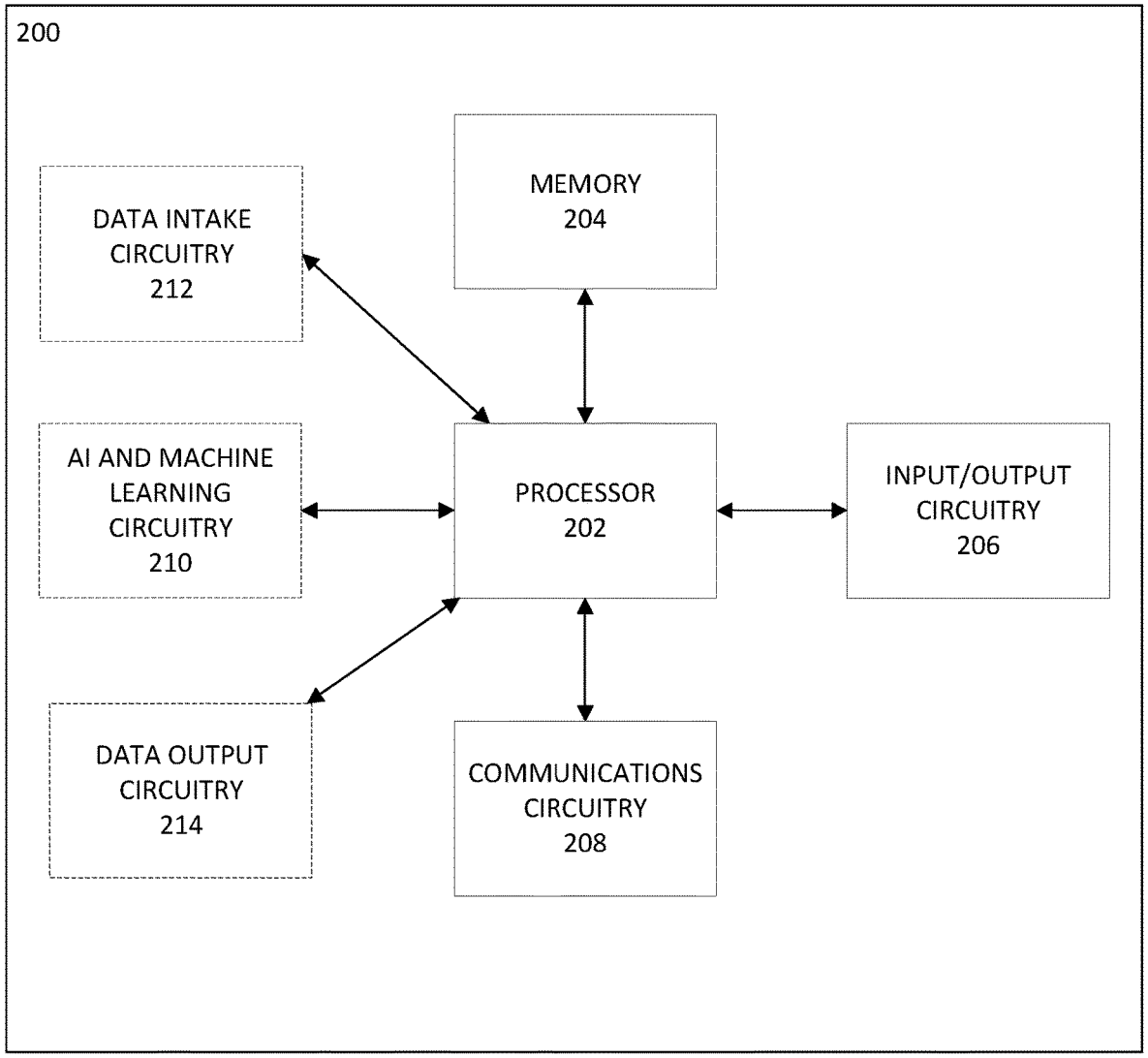
FIG. 2 illustrates an exemplary block diagram of an example apparatus that may be specially configured in accordance with an example embodiment of the present disclosure.

FIG. 2 illustrates an exemplary block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. For example, the computing apparatus 200 may be embodied as one or more of a specifically configured personal computing apparatus, a specifically configured cloud based computing apparatus, a specifically configured embedded computing device (e.g., configured for edge computing), and/or the like. Examples of an apparatus 200 may include, but is not limited to, the apparatus for parallel processing of real-time data and accumulated data 140, the computing devices 110, the historical database 160 and/or the one or more databases 150. The apparatus 200 includes processor 202, memory 204, input/output circuitry 206, communications circuitry 208, and/or optional artificial intelligence ("AI") and machine learning circuitry 210. In some embodiments, the apparatus 200 is configured to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

In various embodiments, such as computing apparatus 200 of an apparatus for parallel processing of real-time data and accumulated data 140 and/or the computing devices 110 may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein. In this regard, the apparatus 200 embodies a particular, specially configured computing entity transformed to enable the specific operations described herein and provide the specific advantages associated therewith, as described herein.

Processor 202 or processor circuitry 202 may be embodied in a number of different ways. In various embodiments, the use of the terms "processor" should be understood to include a single core processor, a multi-core processor, multiple processors internal to the apparatus 200, and/or one or more remote or "cloud" processor(s) external to the apparatus 200. In some example embodiments, processor 202 may include one or more processing devices configured to perform independently. Alternatively, or additionally, processor 202 may include one or more processor(s) configured in tandem via a bus to enable independent execution of operations, instructions, pipelining, and/or multithreading.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, processor 202 may represent an entity (e.g., physically embodied in circuitry) capable of performing operations according to embodiments of the present disclosure while configured accordingly. Alternatively, or additionally, processor 202 may be embodied as an executor of software instructions, and the instructions may specifically configure the processor 202 to perform the various algorithms embodied in one or more operations described herein when such instructions are executed. In some embodiments, the processor 202 includes hardware, software, firmware, and/or a combination thereof that performs one or more operations described herein.

In some embodiments, the processor 202 (and/or coprocessor or any other processing circuitry assisting or otherwise associated with the processor) is/are in communication with the memory 204 via a bus for passing information among components of the apparatus 200.

Memory 204 or memory circuitry 204 may be non-transitory and may include, for example, one or more volatile and/or non-volatile memories. In some embodiments, the memory 204 includes or embodies an electronic storage device (e.g., a computer readable storage medium). In some embodiments, the memory 204 is configured to store information, data, content, applications, instructions, or the like, for enabling an apparatus 200 to carry out various operations and/or functions in accordance with example embodiments of the present disclosure.

Input/output circuitry 206 may be included in the apparatus 200. In some embodiments, input/output circuitry 206 may provide output to the user and/or receive input from a user. The input/output circuitry 206 may be in communication with the processor 202 to provide such functionality. The input/output circuitry 206 may comprise one or more user interface(s). In some embodiments, a user interface may include a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more operations and/or functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a computing device and/or other display associated with a user.

Communications circuitry 208 may be included in the apparatus 200. The communications circuitry 208 may include any means such as a device or circuitry embodied in either hardware or a combination of hardware and software that is configured to receive and/or transmit data from/to a network and/or any other device, circuitry, or module in communication with the apparatus 200. In some embodiments the communications circuitry 208 includes, for example, a network interface for enabling communications with a wired or wireless communications network. Additionally or alternatively, the communications circuitry 208 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 208 may include circuitry for interacting with an antenna(s) and/or other hardware or software to cause transmission of signals via the antenna(s) and/or to handle receipt of signals received via the antenna(s). In some embodiments, the communications circuitry 208 enables transmission to and/or receipt of data from a user device, one or more sensors, and/or other external computing device(s) in communication with the apparatus 200.

Data intake circuitry 212 may be included in the apparatus 200. The data intake circuitry 212 may include hardware, software, firmware, and/or a combination thereof, designed and/or configured to capture, receive, request, and/or otherwise gather data associated with operations of the one or more assets 102. In some embodiments, the data intake circuitry 212 includes hardware, software, firmware, and/or a combination thereof, that communicates with one or more sensor(s) component(s), and/or the like within the one or more computing devices 110, the one or more assets 102, the one or more databases 150, and/or the historical database 160 to receive particular data associated with such operations of the one or more computing devices 110, the one or more assets 102, the one or more databases 150, and/or the historical database 160. Additionally or alternatively, in some embodiments, the data intake circuitry 212 includes hardware, software, firmware, and/or a combination thereof, that retrieves particular data associated with one or more computing devices 110, the one or more assets 102, the one or more databases 150, and/or the historical database 160 from one or more data repository/repositories accessible to the apparatus 200.

AI and machine learning circuitry 210 may be included in the apparatus 200. The AI and machine learning circuitry 210 may include hardware, software, firmware, and/or a combination thereof designed and/or configured to request, receive, process, generate, and transmit data, data structures, control signals, and electronic information for training and executing a trained AI and machine learning model configured to facilitating the operations and/or functionalities described herein. For example, in some embodiments the AI and machine learning circuitry 210 includes hardware, software, firmware, and/or a combination thereof, that identifies training data and/or utilizes such training data for training a particular machine learning model, AI, and/or other model to generate particular output data based at least in part on learnings from the training data. Additionally or alternatively, in some embodiments, the AI and machine learning circuitry 210 includes hardware, software, firmware, and/or a combination thereof, that embodies or retrieves a trained machine learning model, AI and/or other specially configured model utilized to process inputted data. Additionally or alternatively, in some embodiments, the AI and machine learning circuitry 210 includes hardware, software, firmware, and/or a combination thereof that processes received data utilizing one or more algorithm(s), function(s), subroutine(s), and/or the like, in one or more pre-processing and/or subsequent operations that need not utilize a machine learning or AI model.

Data output circuitry 214 may be included in the apparatus 200. The data output circuitry 214 may include hardware, software, firmware, and/or a combination thereof, that configures and/or generates an output based at least in part on data processed by the apparatus 200. In some embodiments, the data output circuitry 214 includes hardware, software, firmware, and/or a combination thereof, that generates a particular report based at least in part on the processed data, for example where the report is generated based at least in part on a particular reporting protocol. Additionally or alternatively, in some embodiments, the data output circuitry 214 includes hardware, software, firmware, and/or a combination thereof, that configures a particular output data object, output data file, and/or user interface for storing, transmitting, and/or displaying. For example, in some embodiments, the data output circuitry 214 generates and/or specially configures a particular data output for transmission to another system sub-system for further processing. Additionally or alternatively, in some embodiments, the data output circuitry 214 includes hardware, software, firmware, and/or a combination thereof, that causes rendering of a specially configured user interface based at least in part on data received by and/or processing by the apparatus 200.

In some embodiments, two or more of the sets of circuitries 202-214 are combinable. Alternatively, or additionally, one or more of the sets of circuitry 202-214 perform some or all of the operations and/or functionality described herein as being associated with another circuitry. In some embodiments, two or more of the sets of circuitry 202-214 are combined into a single module embodied in hardware, software, firmware, and/or a combination thereof. For example, in some embodiments, one or more of the sets of circuitry, for example the AI and machine learning circuitry 210, may be combined with the processor 202, such that the processor 202 performs one or more of the operations described herein with respect the AI and machine learning circuitry 210.

With reference to FIGS. 1-4, an apparatus for parallel processing of real-time data and accumulated data 140 is provided. In some embodiments, the apparatus for parallel processing of real-time data and accumulated data 140 may be configured to determine that one or more of the one or more computing devices 110 were affected by a fault during a first time period (e.g., a first computing device of the one or more computing devices 110 is affected by a fault during a first time period). In some embodiments, a computing device of the one or more computing devices 110 may be affected by a fault when the computing device of the one or more computing devices 110 is disconnected from the network 130. In this regard, when a computing device of the one or more computing devices 110 is affected by a fault, the computing device of the one or more computing devices 110 may be disconnected from the network 130 during the first time period. For example, a computing device of the one or more computing devices 110 may be disconnected from the network 130 to perform maintenance on the computing device, when the computing device malfunctions (e.g., a malfunction associated with the computing device prevents the computing device from connecting to the network 130), and/or the like.

In some embodiments, the apparatus for parallel processing of real-time data and accumulated data 140 may be configured to receive real-time data from at least one of the one or more computing devices 110 via the network 130. In some embodiments, the real-time data may include sensor data representing the operations of the one or more assets 102 associated with the at least one of the one or more computing devices 110. For example, if a computing device of the one or more computing devices 110 includes a temperature sensor, the real-time data may include real-time temperature data associated with one of the one or more assets 102. In some embodiments, the apparatus for parallel processing of real-time data and accumulated data 140 may be configured to receive real-time data from at least one of the one or more computing devices 110 during a second time period. The second time period may be a time period that is different than the first time period. For example, the second time period may occur after the first time period. In some embodiments, the real-time data may represent the operations of the one or more assets 102 associated with the one or more computing devices 110 (e.g., sensor data indicates the operations of the one or more assets 102 associated with the one or more computing devices 110).

Figure 3:
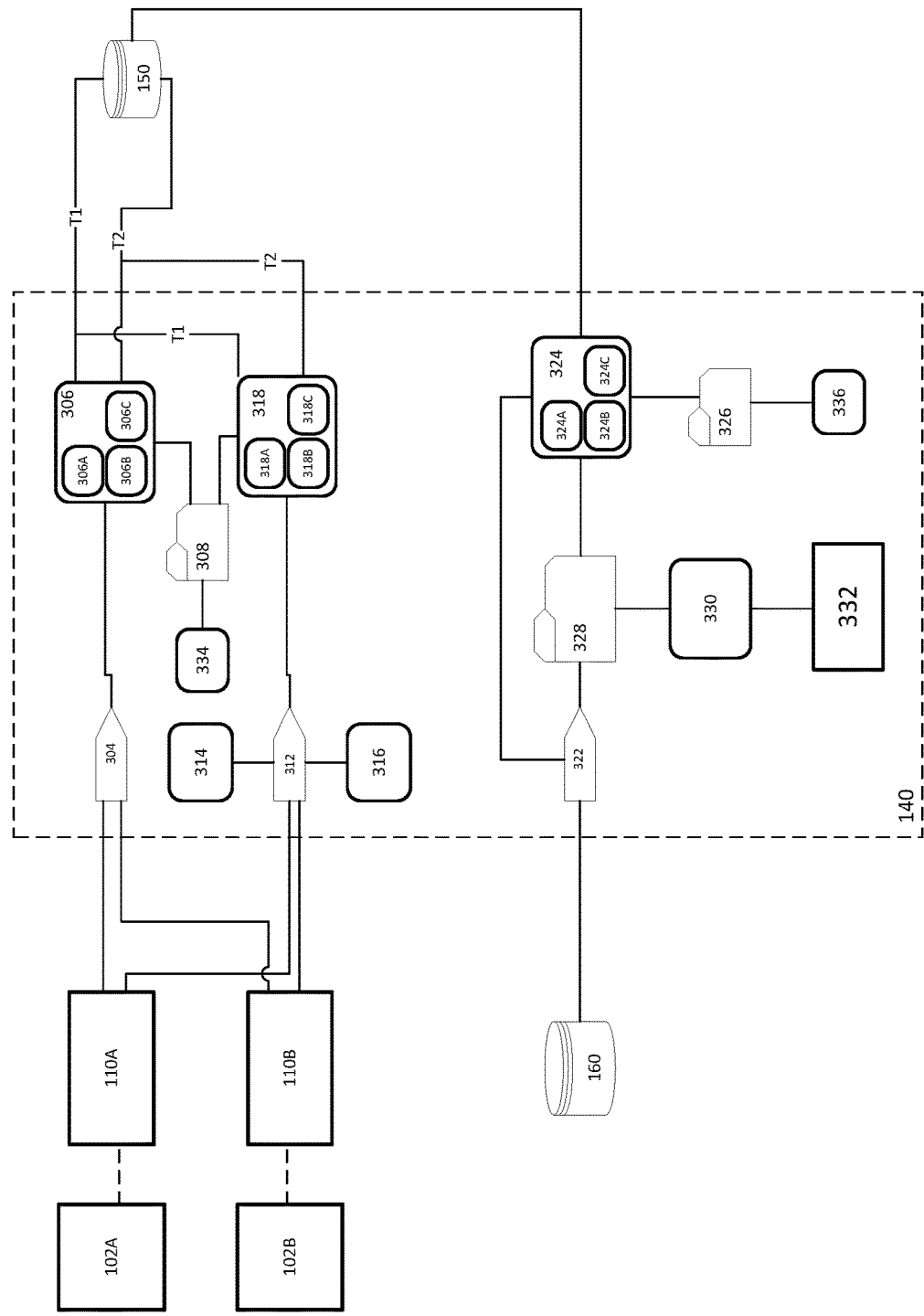
FIG. 3 illustrates an exemplary architecture of an example apparatus for parallel processing of real-time data and accumulated data.

In some embodiments, the apparatus for parallel processing of real-time data and accumulated data 140 may be configured to receive the real-time data via a real-time input port 304. In this regard, the apparatus for parallel processing of real-time data and accumulated data 140 may be configured to receive the real-time data via a real-time input port 304 from each of the one or more computing devices 110. For example, such as illustrated in FIG. 3, if the one or more computing devices 110 include two computing devices, such as a computing device 110A and a computing device 110B, the apparatus for parallel processing of real-time data and accumulated data 140 may be configured to receive the real-time data via real-time input port 304 from the computing device 110A and the computing device 110B.

In some embodiments, the apparatus for parallel processing of real-time data and accumulated data 140 may be configured to direct the real-time data to a real-time data processing unit 306. For example, the real-time input port 304 may be configured to direct the real-time data to the real-time data processing unit 306. In some embodiments, the real-time data processing unit 306 may be configured to process the real-time data processing unit 306. In this regard, for example, the real-time data processing unit 306 may be configured to process the real-time data by performing one or more of ontology processing, normalization processing, and/or interpolation processing. In some embodiments, the real-time data processing unit 306 may be configured to process the real-time data during the second time period.

In some embodiments, the real-time data processing unit 306 may include real-time ontology circuitry 306A configured to perform ontology processing. In some embodiments, the real-time ontology circuitry 306A may be configured to associate computing device metadata with the real-time data (e.g., the ontology processing may include associating computing device metadata with the real-time data).

In some embodiments, the computing device metadata may be received by the real-time ontology circuitry 306A from a computing device metadata repository 308. In some embodiments, the computing device metadata repository 308 may comprise a relational database. In this regard, for example, the computing device metadata in the computing device metadata repository 308 may be in a relational database format. In some embodiments, the computing device metadata repository 308 may receive the computing device metadata from a computing device metadata source 334. In some embodiments, the computing device metadata source 334 may comprise a graphical database. In this regard, for example, the computing device metadata in the computing device metadata source 334 may be in a graphical database format. In some embodiments, the computing device metadata repository 308 may be configured to convert the computing device metadata from a graphical database format to a relational database format.

In some embodiments, associating computing device metadata with the real-time data may include associating the real-time data with characteristics of the one or more computing devices 110 that the real-time data was received from. For example, in the example illustrated in FIG. 3, the real-time ontology circuitry 306A may be configured to associate computing device metadata associated with computing device 110A with real-time data received from the computing device 110A. In this regard, for example, the real-time ontology circuitry 306A may associate real-time data received from the computing device 110A with metadata from the computing device 110A indicating a sensor type (e.g., what type of sensor the computing device 110A is, such as a temperature sensor), an asset location (e.g., the location of the asset 102A associated with the computing device 110A), a location of the computing device 110A within the asset 102A (e.g., where within the asset 102A the computing device 110A is located), an age of the computing device 110A (e.g., how old the computing device 110A is, such as one year old), a device identification (e.g., an identification that uniquely identifies the computing device 110A), a manufacturer of the computing device 110A, and/or the like.

In some embodiments, the real-time data processing unit 306 may include real-time normalization circuitry 306B configured to perform normalization processing. In this regard, for example, the real-time data received from each of the one or more computing devices may be in a non-normalized format when received by the real-time input port 304. For example, real-time data received from computing device 110A may be in a first non-normalized format and real-time data received from computing device 110B may be in a second non-normalized format. In this regard, for example, the real-time normalization circuitry 306B may be configured to process real-time data in a non-normalized format into real-time data in a normalized format. For example, real-time data in a non-normalized format received from computing device 110A and real-time data in a non-normalized format received from computing device 110B may be processed into a normalized format by the real-time normalization circuitry 306B.

In some embodiments, the real-time data processing unit 306 may include real-time interpolation circuitry 306C configured to perform interpolation processing. In this regard, for example, the real-time data received from each of the one or more computing devices may be incomplete (e.g., there are gaps in the real-time data). In some embodiments, the real-time interpolation circuitry 306C may be configured to complete the real-time data by performing interpolation processing (e.g., fill in the gaps in the real-time data). For example, the real-time data may include a plurality of temperatures determined by the computing device 110A on a per second basis over a 1 minute time period (e.g., when the computing device 110A includes a temperature sensor). However, the real-time data may not include a temperature for 1 second during the 1 minute time period (e.g., the real-time data may not include a temperature reading for the 39th second in the 1 minute time period). In this regard, for example, the real-time interpolation circuitry 306C may be configured to determine the temperature for the 1 second during the 1 minute time period for which the real-time data did not include a temperature by performing interpolation processing (e.g., the real-time interpolation circuitry 306C may determine the temperature for the 39th second by performing interpolation processing).

In some embodiments, following the processing performed by the real-time data processing unit 306, the apparatus for parallel processing of real-time data and accumulated data 140 may be configured to route the real-time data to the one or more databases 150. In some embodiments, the one or more databases 150 may be time series databases. In some embodiments, the real-time data routed to the one or more databases may be segregated by tenant. For example, as illustrated in FIG. 3, the real-time data may be segregated by tenant one (T1) and tenant two (T2). In this regard, for example, tenant one (T1) may be associated with computing device 110A and tenant two (T2) may be associated with computing device 110B.

In some embodiments, the apparatus for parallel processing of real-time data and accumulated data 140 may be configured to receive accumulated data from at least one of the one or more computing devices 110. In some embodiments, the apparatus for parallel processing of real-time data and accumulated data 140 may be configured to receive the accumulated data during the second time period. In some embodiments, the accumulated data may be generated by at least one of the one or more computing devices 110 during the first time period. Said differently, during the first time period the one or more computing devices 110 may generate data (e.g., sensor data representing operations of the one or more assets 102) that the one or more computing devices 110 are not able to transmit to the apparatus for parallel processing of real-time data and accumulated data 140 due to the one or more computing devices 110 being affected by a fault (e.g., the one or more computing devices 110 are disconnected from the network 130). In some embodiments, the accumulated data may represent the operations of the one or more assets 102 associated with the one or more computing devices 110 (e.g., sensor data indicates the operations of the one or more assets 102 associated with the one or more computing devices 110).

In some embodiments, the apparatus for parallel processing of real-time data and accumulated data 140 may be configured to receive the accumulated data via an accumulated input port 312. In this regard, the apparatus for parallel processing of real-time data and accumulated data 140 may be configured to receive the accumulated data via an accumulated input port 312 from each of the one or more computing devices 110. For example, such as illustrated in FIG. 3, if the one or more computing devices 110 include two computing devices, such as computing device 110A and computing device 110B, the apparatus for parallel processing of real-time data and accumulated data 140 may be configured to receive the accumulated data via the accumulated input port 312 from the computing device 110A and the computing device 110B.

In some embodiments, the accumulated input port 312 may be configured to receive the accumulated data in response to a pull instruction initiated by pull circuitry 314. In this regard, for example, the pull circuitry 314 may be configured to transmit a pull instruction to the one or more computing devices 110 indicating that the one or more computing devices 110 should provide the accumulated data to apparatus for parallel processing of real-time data and accumulated data 140 (e.g., via the accumulated input port 312). In some embodiments, the pull circuitry 314 may be configured to parse the data received in response to a pull instruction initiated by the pull circuitry 314. In this regard, for example, the pull circuitry 314 may be configured to parse the data received in response to the pull instruction to ensure that the data received in response to the pull instruction only includes the accumulated data. In some embodiments, if the data received in response to the pull instruction includes data other than the accumulated data, the pull circuitry 314 may be configured to disregard the data other than the accumulated data (e.g., the pull circuitry 314 may be configured to cause the apparatus for parallel processing of real-time data and accumulated data 140 to disregard any data received by the accumulated input port 312 that is not the accumulated data).

In some embodiments, the accumulated input port 312 may be configured to receive the accumulated data based on a push instruction initiated by the one or more computing devices 110. In some embodiments, the apparatus for parallel processing of real-time data and accumulated data 140 may include push circuitry 316 configured to parse the data received by the accumulated input port 312 to ensure that the data received from the one or more computing devices 110 only includes the accumulated data. In some embodiments, if the data received in response to the push instruction initiated by the one or more computing devices 110 includes data other than the accumulated data, the push circuitry 316 may be configured to disregard the data other than the accumulated data (e.g., the push circuitry 316 may be configured to cause the apparatus for parallel processing of real-time data and accumulated data 140 to disregard any data received by the accumulated input port 312 that is not the accumulated data).

In some embodiments, the apparatus for parallel processing of real-time data and accumulated data 140 may be configured to direct the accumulated data to an accumulated data processing unit 318. For example, the accumulated input port 312 may be configured to direct the accumulated data to the accumulated data processing unit 318. In this regard, the accumulated input port 312 may be configured to direct the accumulated data to the accumulated data processing unit 318 and not direct any data to the accumulated data disregard by the pull circuitry 314 and/or the push circuitry 316. In some embodiments, the accumulated data processing unit 318 may be configured to process the accumulated data processing unit 318. In this regard, for example, the accumulated data processing unit 318 may be configured to process the accumulated data by performing one or more of ontology processing, normalization processing, and/or interpolation processing. In some embodiments, the accumulated data processing unit 318 may be configured to process the accumulated data during the second time period (e.g., at the same time as the real-time data processing unit 306 process the real-time data).

In some embodiments, the accumulated data processing unit 318 may include accumulated ontology circuitry 318A configured to perform ontology processing. In some embodiments, the accumulated ontology circuitry 318A may be configured to associate computing device metadata with the accumulated data (e.g., the ontology processing may include associating computing device metadata with the accumulated data). In some embodiments, the computing device metadata may be received by the accumulated ontology circuitry 318A from a computing device metadata repository 308.

In some embodiments, associating computing device metadata with the accumulated data may include associating the accumulated data with characteristics of the one or more computing devices 110 that the accumulated data was received from. For example, in the example illustrated in FIG. 3, the accumulated ontology circuitry 318A may be configured to associate computing device metadata associated with computing device 110A with accumulated data received from the computing device 110A. In this regard, for example, the accumulated ontology circuitry 318A may associate accumulated data received from the computing device 110A with metadata from the computing device 110A indicating a sensor type (e.g., what type of sensor the computing device 110A is, such as a temperature sensor), an asset location (e.g., the location of the asset 102A associated with the computing device 110A), a location of the computing device 110A within the asset 102A (e.g., where within the asset 102A the computing device 110A is located), an age of the computing device 110A (e.g., how old the computing device 110A is, such as one year old), a device identification (e.g., an identification that uniquely identifies the device), a manufacturer of the computing device 110A, and/or the like.

In some embodiments, the accumulated data processing unit 318 may include accumulated normalization circuitry 318B configured to perform normalization processing. In this regard, for example, the accumulated data received from each of the one or more computing devices 110 may be in a non-normalized format when received by the accumulated input port 312. For example, accumulated data received from computing device 110A may be in a first non-normalized format and accumulated data received from computing device 110B may be in a second non-normalized format. In this regard, for example, the accumulated normalization circuitry 318B may be configured to process accumulated data in a non-normalized format into accumulated data in a normalized format. For example, accumulated data in a non-normalized format received from computing device 110A and accumulated data in a non-normalized format received from computing device 110B may be processed into a normalized format by the accumulated normalization circuitry 318B.

In some embodiments, the accumulated data processing unit 318 may include accumulated interpolation circuitry 318C configured to perform interpolation processing. In this regard, for example, the accumulated data received from each of the one or more computing devices may be incomplete (e.g., there are gaps in the accumulated data). In some embodiments, the accumulated interpolation circuitry 318C may be configured to complete the accumulated data by performing interpolation processing (e.g., fill in the gaps in the accumulated data). For example, the accumulated data may include a plurality of temperatures determined by the computing device 110A on a per second basis over a 1 minute time period (e.g., when the computing device 110A includes a temperature sensor). However, the accumulated data may not include a temperature for 1 second during the 1 minute time period (e.g., the accumulated data may not include a temperature reading for the $39^{th}$ second in the 1 minute time period). In this regard, for example, the accumulated interpolation circuitry 318C may be configured to determine the temperature for the 1 second during the 1 minute time period for which the accumulated data did not include a temperature by performing interpolation processing (e.g., the accumulated interpolation circuitry 318C may determine the temperature for the $39^{th}$ second by performing interpolation processing).

In some embodiments, following the processing performed by the accumulated data processing unit 318, the apparatus for parallel processing of real-time data and accumulated data 140 may be configured to route the accumulated data to the one or more databases 150. In some embodiments, as described above, the one or more databases 150 may be time series databases. In some embodiments, the accumulated data routed to the one or more databases 150 may be segregated by tenant. For example, as illustrated in FIG. 3, the accumulated data may be segregated by tenant one (T1) and tenant two (T2). In this regard, for example, tenant one (T1) may be associated with computing device 110A and tenant two (T2) may be associated with computing device 110B.

In some embodiments, the apparatus for parallel processing of real-time data and accumulated data 140 may be configured to receive historical data from a historical database 160 via a historical input port 322. In some embodiments, the historical database 160 may be a database associated with the one or more computing devices 110 and/or the one or more assets 102. Alternatively, the historical database 160 may be a database that is not associated with the one or more computing devices 110 and/or the one or more assets 102. In some embodiments, the historical input port 322 may be configured to receive the historical data during the first time period (e.g., when the one or more computing devices 110 are affected by a fault). In some embodiments, the historical input port 322 may be configured to receive the historical data during the first time period (e.g., when the apparatus for parallel processing of real-time data and accumulated data 140 is receiving the real-time data and/or the accumulated data). In some embodiments, the historical input port 322 may be configured to receive the historical data during a third time period (e.g., a time period other than the first time period or the second time period).

In some embodiments, the apparatus for parallel processing of real-time data and accumulated data 140 may be configured to route the historical data to a historical data lake 328. In some embodiments, the apparatus for parallel processing of real-time data and accumulated data 140 may include statistics generation circuitry 330. In some embodiments, the statistics generation circuitry 330 may be configured to analyze the historical data in the historical data lake 328. In this regard, for example, the statistics generation circuitry 330 may be configured to generate one or more statistical representations associated with the historical data. For example, the statistics generation circuitry 330 may generate a statistical representation indicating the quantity of the historical data (e.g., a statistical representation indicating that there is 20 giga bytes of historical data). As another example, the statistics generation circuitry 330 may generate a statistical representation indicating a percentage of the historical data received by the apparatus for parallel processing of real-time data and accumulated data 140 (e.g., via the historical input port 322) that has been routed to the historical data lake 328. As another example, the apparatus for parallel processing of real-time data and accumulated data 140 may generate a statistical representation indicating whether the historical data meets an accuracy threshold. In this regard, for example, the accuracy of the historical data may be determined based at least in part on whether there are one or more errors in the historical data.

Figure 4:
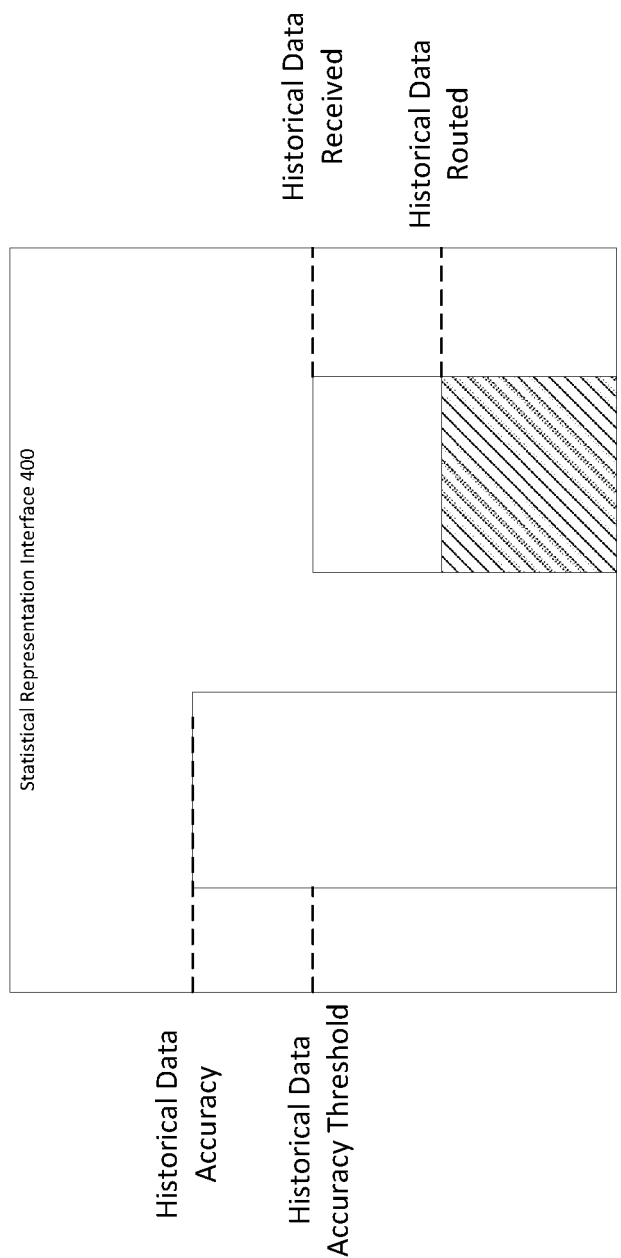
FIG. 4 illustrates an example user interface associated with the example apparatus for parallel processing of real-time data and accumulated data in accordance with one or more embodiments of the present disclosure.

In some embodiments, the apparatus for parallel processing of real-time data and accumulated data 140 may be configured to cause the one or more statistical representations to be displayed on a user interface, such as the statistical representation interface 400. For example, as illustrated in FIG. 4, the apparatus for parallel processing of real-time data and accumulated data 140 may be configured to cause a statistical representation indicating whether the historical data meets an accuracy threshold to be displayed on the statistical representation interface 400. In this regard, for example, the statistical representation interface 400 may indicate a historical data accuracy and/or a historical data accuracy threshold. As another example, as illustrated in FIG. 4, the apparatus for parallel processing of real-time data and accumulated data 140 may be configured to cause a statistical representation indicating a percentage of the historical data received by the apparatus for parallel processing of real-time data and accumulated data 140 (e.g., via the historical input port 322) that has been routed to the historical data lake 328. In this regard, for example, the statistical representation interface 400 may indicate historical data received (e.g., historical data received by the apparatus for parallel processing of real-time data and accumulated data 140 (e.g., via the historical input port 322) and/or historical data routed (e.g., historical data that has been routed to the historical data lake 328).

In some embodiments, the apparatus for parallel processing of real-time data and accumulated data 140 may be configured to direct the historical data to a historical data processing unit 324. In this regard, for example, the historical data lake 328 may be configured to direct the historical data to the historical data processing unit 324. In some embodiments, the historical data lake 328 may be configured to only direct the historical data to the historical data processing unit 324 if the statistical representation indicates that the historical data meets an accuracy threshold. Additionally or alternatively, the historical input port 322 may be configured to direct the historical data to the historical data processing unit 324 (e.g., the historical input port 322 may be configured to direct the historical data such that the historical data bypasses the historical data lake 328). In some embodiments, the historical data processing unit 324 may be configured to process the historical data. In this regard, for example, the historical data processing unit 324 may be configured to process the historical data by performing one or more of ontology processing, normalization processing, and/or interpolation processing.

In some embodiments, the historical data processing unit 324 may include historical ontology circuitry 324A configured to perform ontology processing. In some embodiments, the historical ontology circuitry 324A may be configured to associate historical database metadata with the historical data (e.g., the ontology processing may include associating historical database metadata with the historical data).

In some embodiments, the historical database metadata may be received by the historical ontology circuitry 324A from a historical metadata repository 326. In some embodiments, the historical metadata repository 326 may comprise a relational database. In this regard, for example, the historical database metadata in the historical metadata repository 326 may be in a relational database format. In some embodiments, the historical metadata repository 326 may receive the historical database metadata from a historical database metadata source 336. In some embodiments, the historical database metadata source 336 may comprise a graphical database. In this regard, for example, the historical database metadata in the historical database metadata source 336 may be in a graphical database format. In some embodiments, the historical metadata repository 326 may be configured to convert the historical database metadata from a graphical database format to a relational database format.

In some embodiments, associating historical metadata with the historical data may include associating the historical data with characteristics of the historical database 160 that the historical data was received from. For example, in the example illustrated in FIG. 3, the historical ontology circuitry 324A may be configured to associate historical metadata associated with historical database 160 with historical data received from the historical database 160. In this regard, for example, the historical ontology circuitry 324A may associate historical data received from the historical database 160 with metadata indicating a sensor type associated with the historical data (e.g., what type of sensor data is included in the historical data, such as a historical temperature), a data capture location (e.g., the location of where the historical data was captured), an age of the historical (e.g., how long since the historical data was captured), a device identification associated with the historical data (e.g., an identification that uniquely identifies the device that captured the historical data), and/or the like.

In some embodiments, the historical data processing unit 324 may include historical normalization circuitry 324B configured to perform normalization processing. In this regard, for example, the historical data received from the historical database 160 may be in a non-normalized format when received by the historical input port 322.

In some embodiments, the historical data processing unit 324 may include historical interpolation circuitry 324C configured to perform interpolation processing. In this regard, for example, the historical data received from each of the one or more computing devices may be incomplete (e.g., there are gaps in the historical data). In some embodiments, the historical interpolation circuitry 324C may be configured to complete the historical data by performing interpolation processing (e.g., fill in the gaps in the historical data). For example, the historical data may include a plurality of temperatures determined by the computing device 110A on a per second basis over a 1 minute time period (e.g., when the computing device 110A includes a temperature sensor). However, the historical data may not include a temperature for 1 second during the 1 minute time period (e.g., the historical data may not include a temperature reading for the $39^{th}$ second in the 1 minute time period). In this regard, for example, the historical interpolation circuitry 324C may be configured to determine the temperature for the 1 second during the 1 minute time period for which the historical data did not include a temperature by performing interpolation processing (e.g., the historical interpolation circuitry 324C may determine the temperature for the $39^{th}$ second by performing interpolation processing).

In some embodiments, following the processing performed by the historical data processing unit 324, the apparatus for parallel processing of real-time data and accumulated data 140 may be configured to route the historical data to the one or more databases 150. In some embodiments, as described above, the one or more databases 150 may be time series databases. In some embodiments, the historical data routed to the one or more databases 150 may be segregated by tenant (e.g., a tenant associated with the historical database 160).

Example Methods

Figure 5:
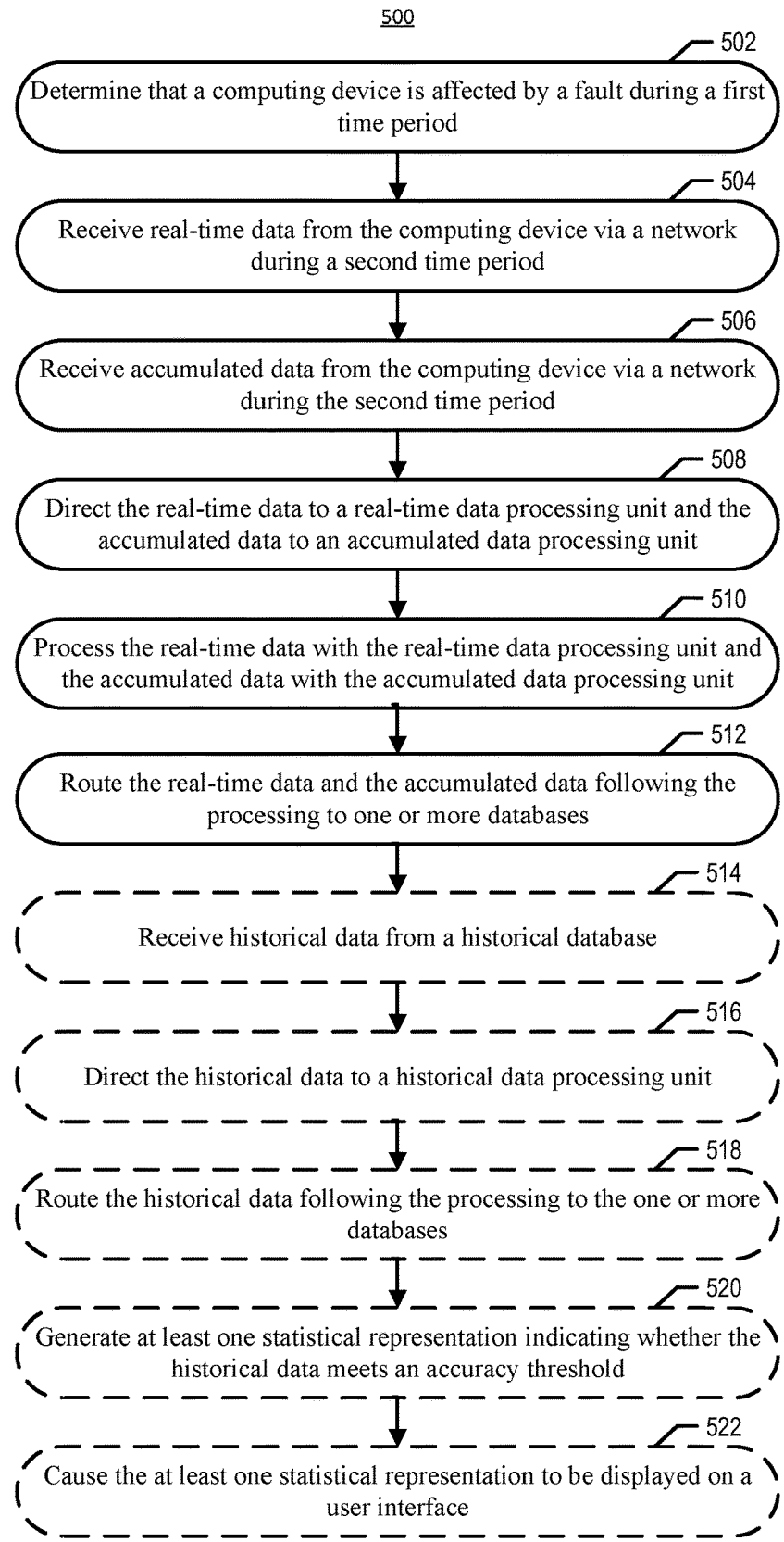
FIG. 5 illustrates a flow chart of an example method for parallel processing of real-time data and accumulated data in accordance with one or more embodiments of the present disclosure.

Referring now to FIG. 5, a flowchart providing an example method for parallel processing of real-time data and accumulated data 500 is illustrated. In this regard, FIG. 5 illustrates operations that may be performed by the apparatus for parallel processing of real-time data and accumulated data 140 and/or components of the apparatus for parallel processing of real-time data and accumulated data 140.

As shown in block 502, the method for parallel processing of real-time data and accumulated data 500 may include determining that a computing device is affected by a fault during a first time period. As described above, in some embodiments, a computing device of the one or more computing devices may be affected by a fault when the computing device of the one or more computing devices is disconnected from the network. In this regard, when a computing device of the one or more computing devices is affected by a fault, the computing device of the one or more computing devices may be disconnected from the network during the first time period. For example, a computing device of the one or more computing devices may be disconnected from the network to perform maintenance on the computing device, when the computing device malfunctions (e.g., a malfunction associated with the computing device prevents the computing device from connecting to the network), and/or the like As shown in block 504, the method for parallel processing of real-time data and accumulated data 500 may include receiving real-time data from the computing device via a network during a second time period. As described above, in some embodiments, the real-time data may include sensor data representing the operations of the one or more assets associated with the at least one of the one or more computing devices. For example, if a computing device of the one or more computing devices includes a temperature sensor, the real-time data may include real-time temperature data associated with one of the one or more assets. In some embodiments, the real-time data may be received from at least one of the one or more computing devices during a second time period. The second time period may be a time period that is different than the first time period. For example, the second time period may occur after the first time period. In some embodiments, the real-time data may represent the operations of the one or more assets associated with the one or more computing devices (e.g., sensor data indicates the operations of the one or more assets associated with the one or more computing devices). As described above, in some embodiments, the real-time data may be received via a real-time input port from each of the one or more computing devices. For example, if the one or more computing devices include two computing devices, such as a computing device and a computing device, the real-time data may be received via real-time input port from the computing device and the computing device.

As shown in block 506, the method for parallel processing of real-time data and accumulated data 500 may include receiving accumulated data from the computing device via a network during the second time period. As described above, in some embodiments, accumulated data may be received from at least one of the one or more computing devices. In some embodiments, the accumulated data may be received during the second time period. In some embodiments, the accumulated data may be generated by at least one of the one or more computing devices during the first time period. Said differently, during the first time period the one or more computing devices may generate data (e.g., sensor data representing operations of the one or more assets) that the one or more computing devices are not able to transmit due to the one or more computing devices being affected by a fault (e.g., the one or more computing devices are disconnected from the network). In some embodiments, the accumulated data may represent the operations of the one or more assets associated with the one or more computing devices (e.g., sensor data indicates the operations of the one or more assets associated with the one or more computing devices). As described above, in some embodiments, the accumulated data may be received via an accumulated input port. In this regard, the accumulated data may be received via an accumulated input port from each of the one or more computing devices.

As shown in block 508, the method for parallel processing of real-time data and accumulated data 500 may include directing the real-time data to a real-time data processing unit and the accumulated data to an accumulated data processing unit. As described above, in some embodiments, the real-time data may be directed to a real-time data processing unit. For example, the real-time input port may be configured to direct the real-time data to the real-time data processing unit. As described above, in some embodiments, the accumulated data may be directed to an accumulated data processing unit. For example, the accumulated input port may be configured to direct the accumulated data to the accumulated data processing unit. In this regard, the accumulated input port may be configured to direct the accumulated data to the accumulated data processing unit and not direct any data to the accumulated data disregard by the pull circuitry and/or the push circuitry.

As shown in block 510, the method for parallel processing of real-time data and accumulated data 500 may include processing the real-time data with the real-time data processing unit and the accumulated data with the accumulated data processing unit. As described above, in some embodiments, the real-time data processing unit may be configured to process the real-time data processing unit. In this regard, for example, the real-time data processing unit may be configured to process the real-time data by performing one or more of ontology processing, normalization processing, and/or interpolation processing. In some embodiments, the real-time data processing unit may be configured to process the real-time data during the second time period. In some embodiments, the accumulated data processing unit may be configured to process the accumulated data processing unit. In this regard, for example, the accumulated data processing unit may be configured to process the accumulated data by performing one or more of ontology processing, normalization processing, and/or interpolation processing. In some embodiments, the accumulated data processing unit may be configured to process the accumulated data during the second time period (e.g., at the same time as the real-time data processing unit process the real-time data).

As shown in block 512, the method for parallel processing of real-time data and accumulated data 500 may include routing the real-time data and the accumulated data following the processing to one or more databases. As described above, in some embodiments, the one or more databases may be time series databases. In some embodiments, the real-time data routed to the one or more databases may be segregated by tenant. For example, the real-time data may be segregated by tenant one (T1) and tenant two (T2). In this regard, for example, tenant one (T1) may be associated with computing device and tenant two (T2) may be associated with computing device. As described above, in some embodiments, the one or more databases may be time series databases. In some embodiments, the accumulated data routed to the one or more databases may be segregated by tenant. For example, the accumulated data may be segregated by tenant one (T1) and tenant two (T2). In this regard, for example, tenant one (T1) may be associated with computing device and tenant two (T2) may be associated with computing device.

As shown in block 514, the method for parallel processing of real-time data and accumulated data 500 may optionally include receiving historical data from a historical database.

As described above, in some embodiments, the historical database may be a database associated with the one or more computing devices and/or the one or more assets. Alternatively, the historical database may be a database that is not associated with the one or more computing devices and/or the one or more assets. In some embodiments, the historical input port may be configured to receive the historical data during the first time period (e.g., when the one or more computing devices are affected by a fault). In some embodiments, the historical input port may be configured to receive the historical data during the first time period (e.g., when the real-time data and/or the accumulated data is being received). In some embodiments, the historical input port may be configured to receive the historical data during a third time period (e.g., a time period other than the first time period or the second time period).

As shown in block 516, the method for parallel processing of real-time data and accumulated data 500 may optionally include directing the historical data to a historical data processing unit. As described above, in some embodiments, the historical data lake may be configured to direct the historical data to the historical data processing unit. In some embodiments, the historical data lake may be configured to only direct the historical data to the historical data processing unit if the statistical representation indicates that the historical data meets an accuracy threshold. Additionally or alternatively, the historical input port may be configured to direct the historical data to the historical data processing unit (e.g., the historical input port may be configured to direct the historical data such that the historical data bypasses the historical data lake).

As shown in block 518, the method for parallel processing of real-time data and accumulated data 500 may optionally include routing the historical data following the processing to the one or more databases. As described above, in some embodiments, the historical data processing unit may be configured to process the historical data. In this regard, for example, the historical data processing unit may be configured to process the historical data by performing one or more of ontology processing, normalization processing, and/or interpolation processing.

As shown in block 520, the method for parallel processing of real-time data and accumulated data 500 may optionally include generating at least one statistical representation indicating whether the historical data meets an accuracy threshold. As described above, in some embodiments, statistics generation circuitry may be configured to analyze the historical data in the historical data lake. In this regard, for example, the statistics generation circuitry may be configured to generate one or more statistical representations associated with the historical data. For example, the statistics generation circuitry may generate a statistical representation indicating the quantity of the historical data (e.g., a statistical representation indicating that there is 20 giga bytes of historical data). As another example, the statistics generation circuitry may generate a statistical representation indicating a percentage of the historical data that has been routed to the historical data lake. As another example, a statistical representation indicating whether the historical data meets an accuracy threshold may be generated. In this regard, for example, the accuracy of the historical data may be determined based at least in part on whether there are one or more errors in the historical data.

As shown in block 522, the method for parallel processing of real-time data and accumulated data 500 may optionally include causing the at least one statistical representation to be displayed on a user interface. For example, a statistical representation indicating whether the historical data meets an accuracy threshold may be caused to be displayed on the statistical representation interface. In this regard, for example, the statistical representation interface may indicate a historical data accuracy and/or a historical data accuracy threshold.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

That which is claimed:

1. A computer-implemented method for parallel processing of real-time data and accumulated data, the method comprising:
    determining that a computing device is affected by a fault during a first time period;
    receiving real-time data from the computing device via a network during a second time period;
    receiving accumulated data from the computing device via a network during the second time period, wherein the accumulated data was generated by the computing device during the first time period;
    directing the real-time data to a real-time data processing unit and the accumulated data to an accumulated data processing unit;
    processing the real-time data with the real-time data processing unit and the accumulated data with the accumulated data processing unit; and
    routing the real-time data and the accumulated data following the processing to one or more databases.

2. The computer-implemented method of claim 1, wherein the fault comprises the computing device being disconnected from the network.

3. The computer-implemented method of claim 1, wherein the one or more databases are time series databases.

4. The computer-implemented method of claim 1, further comprising:
    receiving historical data from a historical database;
    directing the historical data to a historical data processing unit; and
    routing the historical data following the processing to the one or more databases.

5. The computer-implemented method of claim 4, wherein the historical data is received from the historical database during the first time period, the second time period, or a third time period.

6. The computer-implemented method of claim 4, further comprising:
    generating at least one statistical representation indicating whether the historical data meets an accuracy threshold.

7. The computer-implemented method of claim 6, further comprising:
    causing the at least one statistical representation to be displayed on a user interface.

8. The computer-implemented method of claim 1, wherein the real-time data processing unit and the accumulated data processing unit comprise one or more of ontology circuitry or normalization circuitry.

9. The computer-implemented method of claim 8, wherein the ontology circuitry is configured to associate computing device metadata with the real-time data and the accumulated data.

10. The computer-implemented method of claim 1, wherein the real-time data and the accumulated data comprises sensor data representing the operations of an asset associated with the computing device.

11. An apparatus for parallel processing of real-time data and accumulated data, the apparatus comprising at least one processor and at least one memory coupled to the at least one processor, wherein the at least one processor is configured to:
    determine that a computing device is affected by a fault during a first time period;
    receive real-time data from the computing device via a network during a second time period;
    receive accumulated data from the computing device via a network during the second time period, wherein the accumulated data was generated by the computing device during the first time period;
    direct the real-time data to a real-time data processing unit and the accumulated data to an accumulated data processing unit;
    process the real-time data with the real-time data processing unit and the accumulated data with the accumulated data processing unit; and
    route the real-time data and the accumulated data following the processing to one or more databases.

12. The apparatus of claim 11, wherein the fault comprises the computing device being disconnected from the network.

13. The apparatus of claim 11, wherein the one or more databases are time series databases.

14. The apparatus of claim 11, wherein the at least one processor is configured to:
    receive historical data from a historical database;
    direct the historical data to a historical data processing unit; and
    route the historical data following the processing to the one or more databases.

15. The apparatus of claim 14, wherein the historical data is received from the historical database during the first time period, the second time period, or a third time period.

16. The apparatus of claim 14, wherein the at least one processor is configured to:
    generate at least one statistical representation indicating whether the historical data meets an accuracy threshold.

17. The apparatus of claim 11, wherein the real-time data processing unit and the accumulated data processing unit comprise one or more of ontology circuitry or normalization circuitry.

18. The apparatus of claim 17, wherein the ontology circuitry is configured to associate computing device metadata with the real-time data and the accumulated data.

19. The apparatus of claim 11, wherein the real-time data and the accumulated data comprises sensor data representing the operations of an asset associated with the computing device.

20. A non-transitory computer-readable storage medium for parallel processing of real-time data and accumulated data comprising computer program code for execution by one or more processors of a device, the computer program code configured to, when executed by the one or more processors, cause the device to:

determine that a computing device is affected by a fault during a first time period;

receive real-time data from the computing device via a network during a second time period;

receive accumulated data from the computing device via a network during the second time period, wherein the accumulated data was generated by the computing device during the first time period;

direct the real-time data to a real-time data processing unit and the accumulated data to an accumulated data processing unit;

process the real-time data with the real-time data processing unit and the accumulated data with the accumulated data processing unit; and route the real-time data and the accumulated data following the processing to one or more databases.

* * * * *